US009897217B2

(12) United States Patent
Greene (10) Patent No.: US 9,897,217 B2
(45) Date of Patent: Feb. 20, 2018

(54) LOW-DRAG SEALING METHOD FOR THERMAL MANAGEMENT VALVE (71) Applicant: Magna Powertrain Inc., Concord (CA)

(72) Inventor: Darrell F. Greene, Bradford (CA)

(73) Assignee: MAGNA POWERTRAIN INC., Concord, CA (US)

( * ) Notice: Subject to any disclaimer, the term of this patent is extended or adjusted under 35 U.S.C. 154(b) by 44 days.

(21) Appl. No.: 14/787,075

(22) PCT Filed: May 16, 2014

(86) PCT No.: PCT/IB2014/061497
§ 371 (c)(1),
(2) Date: Oct. 26, 2015

(87) PCT Pub. No.: WO2014/184783
PCT Pub. Date: Nov. 20, 2014

(65) Prior Publication Data
US 2016/0109031 A1    Apr. 21, 2016

Related U.S. Application Data (60) Provisional application No. 61/824,722, filed on May 17, 2013.

(51) Int. Cl.
F16K 11/085 (2006.01)
F16K 5/20 (2006.01)
F16K 11/087 (2006.01)

(52) U.S. Cl.
CPC ............ F16K 5/201 (2013.01); F16K 11/085 (2013.01); F16K 11/0876 (2013.01)

(58) Field of Classification Search
USPC ......................... 137/625.46, 625.47; 251/174
See application file for complete search history.

(56) References Cited

U.S. PATENT DOCUMENTS 4,281,942 A    8/1981  Gaeckle et al.
4,557,487 A   12/1985  Banas et al.
(Continued)

FOREIGN PATENT DOCUMENTS

CA    2652554 A1   11/2007
CN    85205499 U    6/1987
(Continued)

OTHER PUBLICATIONS

International Search Report for International Application No. PCT/IB2014/061497, Filed May 16, 2014.

Primary Examiner — John Fox
(74) Attorney, Agent, or Firm — Warn Partners, P.C.

(57) ABSTRACT

A low-drag seal arrangement for a thermal management valve including a housing having a chamber and at least one bore for flowing a fluid medium through the at least one bore between a location exterior of the housing and the chamber of the housing. A rotor is configured to rotate within the chamber of the housing relative to the bore. The rotor moves between a closed position where the flow of fluid medium through the at least one bore is blocked, an open position where the fluid medium flows through the at least one bore and an intermediate position where the flow of fluid medium through the at least one bore is partially restricted by the rotor's position relative to the bore. The low-drag seal arrangement also includes a face seal piston positioned within the at least one bore and configured to move axially within the bore.

8 Claims, 5 Drawing Sheets

(56) References Cited

U.S. PATENT DOCUMENTS

| | | | |
|---|---|---|---|
| 4,566,482 A | | 1/1986 | Stunkard |
| 4,928,921 A | * | 5/1990 | Steele .................. F16K 5/0673 |
| | | | 251/175 |
| 5,617,815 A | | 4/1997 | Spies et al. |
| 5,893,392 A | | 4/1999 | Spies et al. |
| 5,906,224 A | * | 5/1999 | Tupper ............... F16K 11/0876 |
| | | | 137/625.47 |
| 6,164,248 A | | 12/2000 | Lehmann |
| 6,371,060 B1 | | 4/2002 | Lehmann et al. |
| 6,539,899 B1 | | 4/2003 | Piccirilli et al. |
| 6,647,934 B2 | | 11/2003 | Marsh et al. |
| 6,688,333 B2 | | 2/2004 | McLane et al. |
| 6,920,845 B2 | | 7/2005 | Lelkes et al. |
| 6,923,211 B2 | | 8/2005 | McLane et al. |
| 6,966,537 B2 | * | 11/2005 | Sundararajan .......... F16K 3/207 |
| | | | 251/172 |
| 6,974,121 B2 | * | 12/2005 | Koester .................. F16K 5/204 |
| | | | 251/174 |
| 6,976,505 B2 | | 12/2005 | McLane et al. |
| 6,994,316 B2 | | 2/2006 | Pervaiz |
| 7,082,902 B2 | | 8/2006 | Lolli et al. |
| 7,131,460 B2 | | 11/2006 | McLane et al. |
| 7,163,194 B2 | | 1/2007 | Pervaiz |
| 7,165,513 B2 | | 1/2007 | Humburg |
| 7,168,397 B2 | | 1/2007 | Chanfreau et al. |
| 7,255,129 B2 | | 8/2007 | Lopez |
| 7,302,919 B2 | | 12/2007 | Vacca et al. |
| 7,343,882 B2 | | 3/2008 | Pipkorn et al. |
| 7,412,948 B2 | | 8/2008 | Pipkorn et al. |
| 7,444,997 B2 | | 11/2008 | Hill |
| 7,506,664 B2 | | 3/2009 | Norris et al. |
| 7,726,265 B2 | | 6/2010 | Komurian et al. |
| 7,814,892 B2 | | 10/2010 | Hill |
| 7,984,700 B2 | | 7/2011 | Chanfreau et al. |
| 8,251,373 B2 | * | 8/2012 | Lev ...................... F16J 15/3236 |
| | | | 277/442 |
| 8,720,855 B2 | * | 5/2014 | Beasley ............... F16K 5/0678 |
| | | | 251/170 |
| 2001/0032951 A1 | | 10/2001 | Stewart |
| 2004/0164496 A1 | | 8/2004 | Okada et al. |
| 2006/0118066 A1 | | 6/2006 | Martins |
| 2012/0055652 A1 | | 3/2012 | Triebe et al. |

FOREIGN PATENT DOCUMENTS

| | | |
|---|---|---|
| CN | 1780999 A | 5/2006 |
| CN | 101270821 A | 9/2008 |
| CN | 101328981 A | 12/2008 |
| DE | 10323900 A1 | 1/2005 |
| DE | 10335831 A1 | 3/2005 |
| DE | 10345614 A1 | 5/2005 |
| EP | 1819952 B1 | 8/2007 |
| EP | 2295757 A1 | 3/2011 |
| EP | 1697668 B1 | 8/2011 |
| EP | 2314900 A3 | 11/2011 |
| FR | 2849673 A1 | 7/2004 |
| GB | 2344152 A | 5/2000 |
| GB | 2392484 B | 9/2005 |
| WO | 2001014773 A1 | 3/2001 |
| WO | 2003046342 A1 | 6/2003 |
| WO | 2007131942 A1 | 11/2007 |
| WO | 2008049624 A2 | 5/2008 |
| WO | 2010112402 A1 | 10/2010 |
| WO | 2013120068 A2 | 8/2013 |

* cited by examiner

LOW-DRAG SEALING METHOD FOR THERMAL MANAGEMENT VALVE

CROSS-REFERENCE TO RELATED APPLICATIONS

This application is a National Stage of International Application No. PCT/IB2014/061497, filed May 16, 2014, which claims benefit of U.S. Patent Application No. 61/824,722, filed on May 17, 2013. The disclosures of the above applications are incorporated herein by reference.

FIELD OF THE INVENTION

The present invention relates to thermal management valves and low-drag sealing arrangements for use in thermal management valves.

BACKGROUND OF THE INVENTION

Rotor valves are known for use in applications where a source of fluid is directed through a housing to one of several destinations. Such valves can be found in thermal management systems for automotive applications including engine cooling, vehicle cabin HVAC systems, emissions system valves, engine intake valves, engine exhaust management valves. A typical rotor valve has a rotor that can be rotated about a longitudinal axis in a chamber of a valve body or housing. When the rotor is rotated to a closed position, the rotor blocks fluid flow through a bore or passage in the housing. One problem with this type of valve is how to establish an effective fluid seal between the surface of the rotor and the valve body, while at the same time avoiding excessive operating torque or the need to have actuators of significant size. A rotor valve arrangement must both prevent fluid from exiting the valve housing when a particular inlet is in the closed position, but must also prevent pressurized fluid from entering the valve housing through a closed opening. Thus the operating conditions at the various interfaces between the rotor and inlets can vary since some of the bores may be pressurized or in a vacuum or at ambient pressures.

It is therefore desirable to have a new arrangement where the amount of friction between a resilient member of a piston and valve bore is reduced so that the force of the resilient member and actuator is used more efficiently and in some cases can be changed or reduced in size. It is also desirable to provide an improved arrangement where there is a better sealing connection between the seal arrangement and bore so that when the valve is in the closed position, there is no leakage.

SUMMARY OF THE INVENTION

The present invention relates to a low-drag seal arrangement for a thermal management valve. The low-drag seal arrangement includes a housing having a chamber and at least one bore for flowing a fluid medium through the bore between a location exterior of the housing and the chamber of the housing. A rotor is configured to rotate within the chamber of the housing relative to the bore. The rotor moves between a closed position where the flow of fluid medium through the bore is blocked and an open position where the fluid medium flows through the bore. There is also an intermediate position where the flow of fluid medium through the bore is partially restricted by the rotor's position relative to the bore. The low-drag seal arrangement further includes a face seal piston positioned within the bore configured to move axially within the bore. The face seal piston has a portion coated with low friction material that is in selective engagement with the rotor, when the rotor moves to the closed position or the intermediate position.

Each bore of the low-drag seal arrangement has a circumferential groove formed in a wall of the bore, where the circumferential groove circumscribes a portion of the face seal piston when the face seal piston is positioned within the bore. A quad-seal is located within the circumferential groove for creating a seal between the bore and the face seal piston. The face seal piston slides bi-directionally through the quad-seal and moves within the bore. During movement of the face seal piston, the quad-seal maintains a sealed connection between the bore and the face seal piston.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 2A:
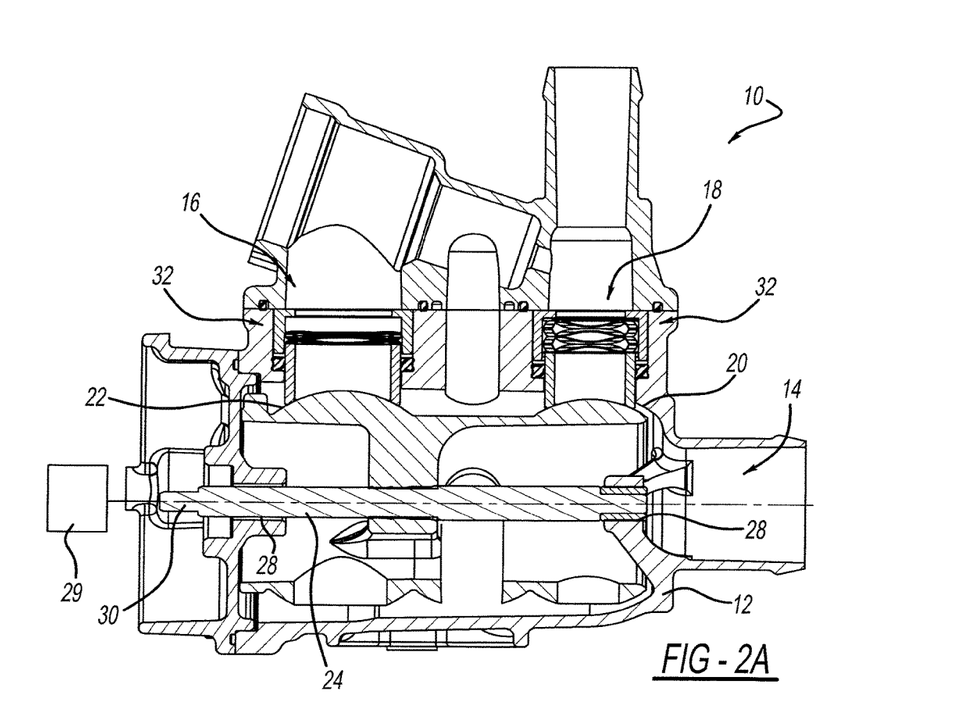
FIG. 2A is a cross-sectional plan view of a thermal management valve having two low drag seals positioned in their respective bores.

Referring now to FIG. 2A, a cross-sectional schematic view of a thermal management valve 10 is shown. In the present embodiment of the invention, the thermal management valve 10 is a rotary valve having a housing 12 with at least one bore, in particular, an outlet bore 14, a first inlet bore 16 and a second inlet bore 18. The housing 12 defines a chamber 20 wherein a rotor 22 is configured to rotate within the chamber 20 and interact with the outlet bore 14, first inlet bore 16 and second inlet bore 18, in order to open and close the first inlet bore 16 and second inlet bore 18 to control the flow of fluid through the thermal management valve 10. The thermal management valve according to the present invention operates by having fluid flow through the first inlet bore 16 and second inlet bore 18, through an aperture 23 in the rotor 22 and into the chamber 20, when the rotor 22 is rotated to the open position. From the chamber 20 the fluid flows through the valve outlet bore 14. When the rotor 22 is in the closed position fluid is blocked from leaving the first inlet bore 16 and second inlet bore 18 past the rotor 22 into the chamber 20. It is within the scope of this invention for the valve to operate in the reverse manner, where fluid flows into the thermal management valve 10 through the outlet bore 14 and exits through the first inlet bore 16 and second inlet bore 18.

The rotor 22 is rotatably positioned on a shaft 24 that extends through the housing 12 and chamber 20. The shaft 24 is configured to rotate about a longitudinal axis 26 and is rotatably supported on bearings 28 positioned on the walls of the housing 12. The shaft 24 of the rotor 22 has an actuation end 30 extending outside of the housing 12 for interacting with an actuator 29 that controls the rotation of the shaft 24 and rotor 27 about an axis 26. The features of the thermal management valve 10 allow for smaller actuators 29 to be used since the amount of torque needed to rotate the shaft 24 will be lowered.

The first inlet bore 16 and the second inlet bore 18 have a low-drag seal 32 positioned within each of the first inlet bore 16 and second inlet 18. The low-drag seal 32 selectively contacts the rotor 22 and creates a sealed connection between the low-drag seal 32 and the rotor 22 when the rotor 22 rotates between a closed position, an open position or an intermediate position allowing the flow of fluid through the respective first inlet bore 16 or second inlet bore 18.

Figure 2B:
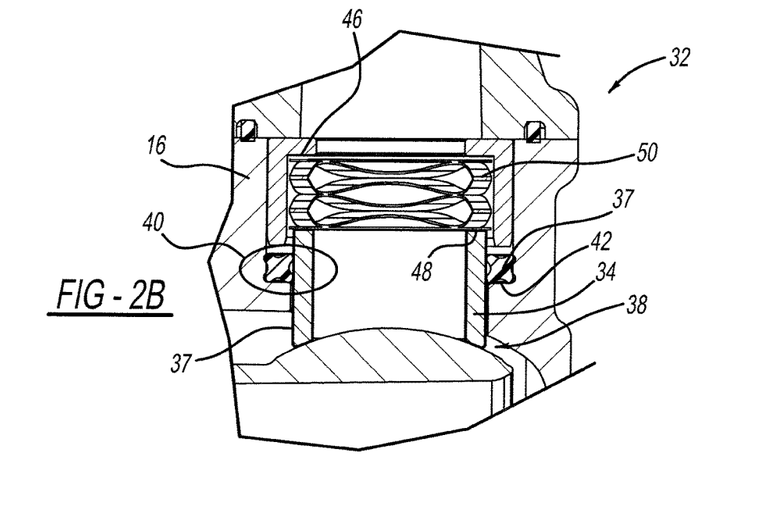
FIG. 2B is an exploded cross-sectional plan view of one of the low drag seals of FIG. 2A.
Figure 2C:
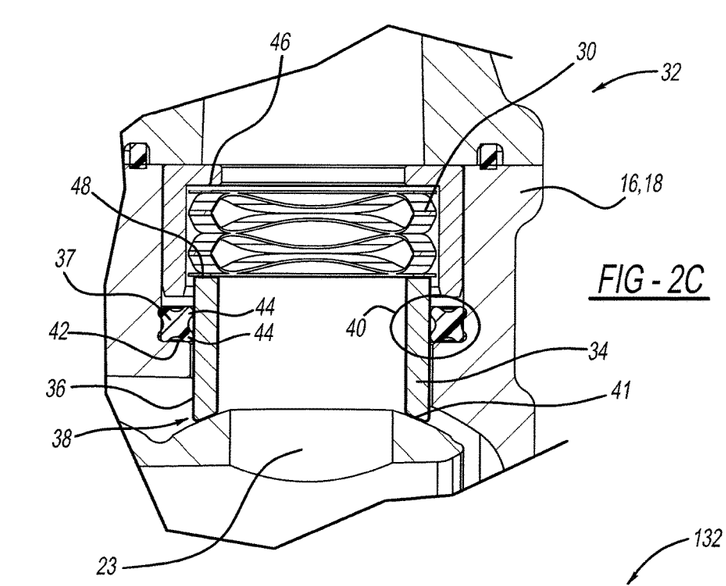
FIG. 2C is an exploded cross-sectional plan view of one of the thermal management valves of FIG. 2A.

Referring now to FIGS. 2B and 2C, the details of the low-drag seal 32 are shown. In particular, the low-drag seal 32 shown in FIGS. 2A and 2B have a face seal piston 34 that is positioned within the respective first inlet bore 16 or second inlet bore 18. While the embodiments of the invention shown in FIGS. 3A-3B depict a first inlet bore 16 and second inlet bore 18, it is within the scope of this invention for there to be a greater or lesser number of inlet bores that can interact with the rotor 22 and control the flow of fluid through the thermal management valve 10. It is also within the scope of the invention for the first inlet bore 16 and second inlet bore 18 to be inlet bores where fluid is flowing out of the thermal management valve 10 rather than fluid flowing into the thermal management valve 10 as configured in the embodiment of the invention shown in FIG. 2A.

Figure 1A:
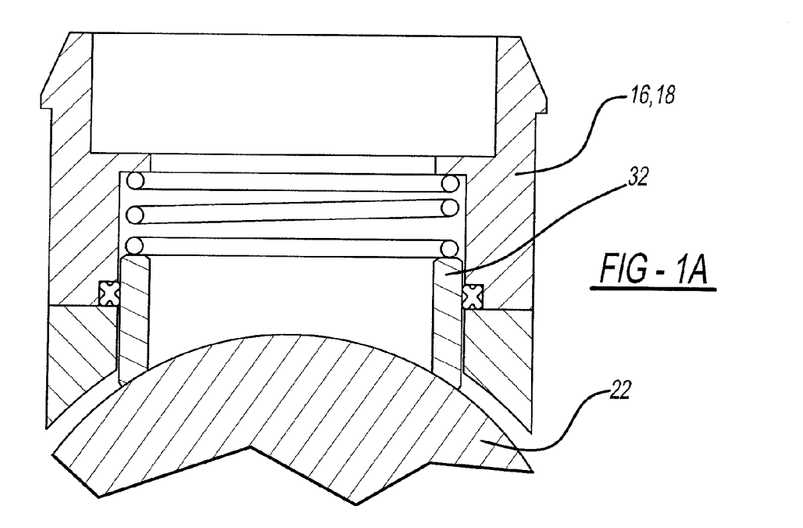
FIG. 1A is a cross-sectional schematic view of a low drag seal for a thermal management valve in accordance with the present invention, interacting with a rotor.
Figure 1B:
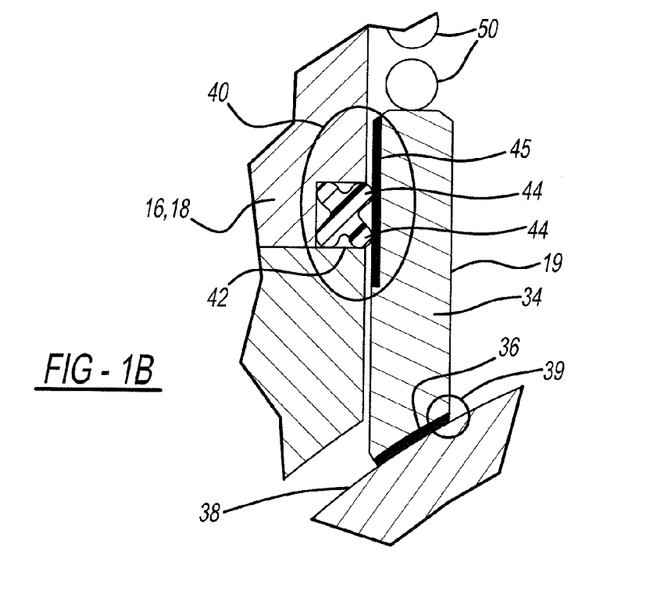
FIG. 1B is an exploded cross-sectional schematic view of a low drag seal for a thermal management valve in accordance with the present invention

Referring to FIG. 1B, the face seal piston 34 has a portion 36 coated with a low-friction material in order to minimize the amount of friction generated between the contact area 38 between the face seal piston 34 and rotor 22 as well as a portion 45 coated with low-friction material at the seal contact area 40 between the outer surface of the face seal piston 34 and a quad-seal 37. In operation the reduced friction in the portion causes an inside edge 39 of the face seal piston 34 to begin forming a tight seal against the rotor 22, which when creates a tight seal across the portion 36.

While the face seal piston 34 is described as being coated, it is also within the scope of this invention for the low-friction material to be solid low friction material formed with or into a surface 37 of the face seal piston 34 as shown in FIG. 2B. In the embodiments shown in FIGS. 1, 2A and 2B, the portion 36 of the face seal piston 34 coated with low friction material is the surfaces where the contact area 38 and seal contact area surfaces 40 are located; however, it is within the scope of this invention for the entire surface of the face seal piston 34 to be coated with low friction material. The low friction material can be polytetrafluoroethylene (PTFE). Other examples of possible low-friction materials include, but are not limited to, ceramic, nylon, high density polyethylene (HDPE), graphite or other suitable friction materials having a static friction coefficient generally in the range of 0.2 to 0.6, preferably 0.2 to 0.5 and ideally equal to or less than 0.04.

The face seal piston 34 had an inner surface 19 that is smooth and does not have any ridges or grooves. This allows fluid to flow through the bore 16, 18 without being inhibited or deflected by any features on the inside surface of the face seal piston 34.

Figure 1C:
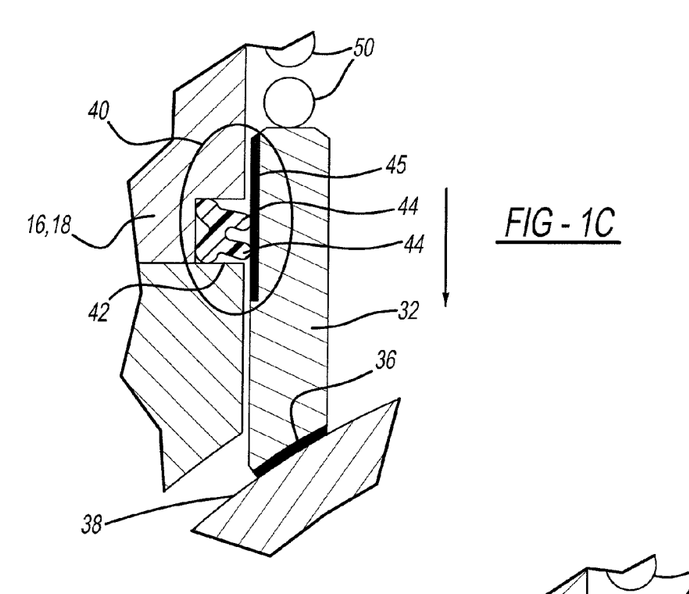
FIG. 1C is an exploded cross-sectional schematic view of a low drag seal for a thermal management valve.
Figure 1D:
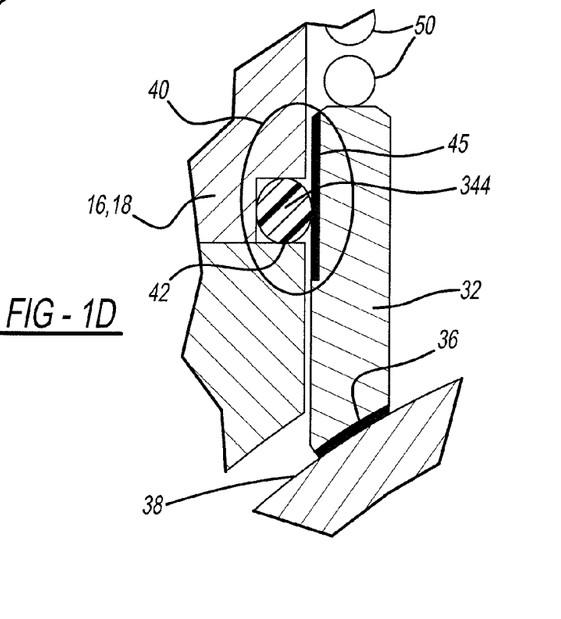
FIG. 1D is an alternate embodiment of the exploded cross-sectional schematic view of a low drag seal for a thermal management valve.

The quad-seal 37 is positioned within a circumferential groove 42 formed in each of the first inlet bore 16 and second inlet bore 18. The circumferential groove 42 circumscribes a portion of the face seal piston 34 such that the face seal piston 34 extends through and slides back and forth through the quad-seal 37. The quad-seal 37 creates a seal between the respective first inlet bore 16 and second inlet bore 18 and the respective face seal piston 34. The face seal piston slides bi-directionally through the quad-seal 37 in a manner that the quad-seal 37 maintains a sealed connection between the respective first inlet bore 16 and second inlet bore 18 and the face seal piston 34. The present embodiment of the invention describes the use of a quad-seal 37; however, it is within the scope of this invention for the quad-seal 37 to be an o-ring 344 as shown in FIG. 1D. It is also within the scope of this invention for the quad seal 37 to be a lip seal or other suitable seal member.

The face seal piston 38 has two points of contact 44 that contact the surface of the face seal piston 34. The two points of contact 44 provide improved sealing between the quad-seal 37 and face seal piston 34. In particular the quad seal 37 gets squeezed between the bore 16, 18 and the outer diameter surface of the face seal piston 34 when the face seal piston moves axially in the bore 16, 18 as shown in FIG. 1C. The squeezing effect helps to center the face seal piston in the bore 16, 18, particularly when the length to width ratio of the face seal piston 34 is low. Also having two points of contact 44 allows for less material of the quad seal 37 to get squeezed.

Each first inlet bore 16 and second inlet bore 18 have a spring seat 46 extending into the bore above the face seal piston 34. Between the spring seat 46 and a top surface 48 of the face seal piston 34 is a resilient member 50. In the present invention, the resilient member 50 is a spring having a first end in contact with the top surface 48 of the face seal piston 34 and second end in contact with the spring seat 46 of the first inlet bore 16 or second inlet bore 18. The resilient member is configured to apply force on the face seal 34 in the direction of the rotor 22. As shown in FIGS. 1, 2A and 2B, the resilient member 50 applies force in a downward direction as shown in the FIGS. 1, 2A, 2B.

The present invention utilizes the quad-seal 37 positioned within the circumferential groove 42 in order to provide a better seal and reduce the amount of friction between the quad-seal 37 and the moving face seal piston 34. The face seal piston 34, as described above, has a low friction material coating the seal contact area 40 in order to reduce the amount of friction between the quad-seal 37 and the outer surface of the face seal piston 34. The combination of using low friction material and a quad-seal having two points of contact 44 reduces the amount of drag or friction between the face seal piston 34 and the quad-seal 37 as the face seal piston 34 moves along a longitudinal axis when contacting the rotor 22. This reduces the amount of torque necessary to rotate the rotor 22, thereby reducing the size of the actuator 29 and size of the spring 50 needed to rotate the shaft 24 of the rotor 22. Additionally, the combination of elements described and the thermal management valve 10 reduces the amount of force that the resilient member 50 must supply in order to force the face seal piston 34 into contact with the rotor 22, resulting in a more efficient use of the amount of force from the resilient member 50, by allowing it to apply downward force more effectively without having to use some of the force of the resilient member 50, to overcome the friction or drag between the face seal piston 34 and the quad-seal 37.

The present invention is also a distinct advantage over the traditional wiper seals, where a wiper seal having an acceptable radial sealing performance would have a much greater amount of drag between the seal member and the wall of the bore. In the prior art, the seal member is connected to the moving piston and contacts the bore, which is made of polyphenylene sulfide which results in a greater amount of friction between the seal and the wall of the bore. The increased amount of friction does not allow for efficient use of a resilient member, which must be larger in order to overcome the friction force between the seal and the wall of the bore as well as providing enough force to effectively contact and seal the face seal piston against the rotor.

Figure 3:
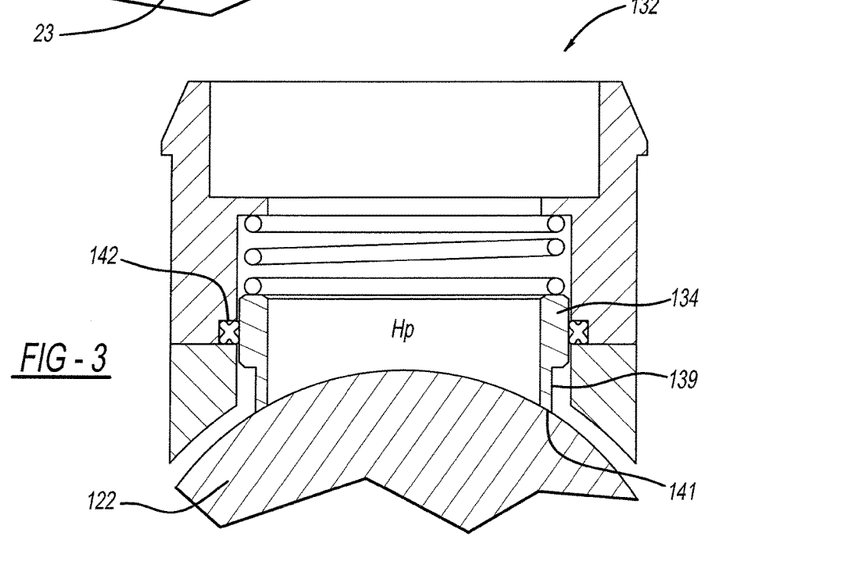
FIG. 3 is a cross-sectional schematic diagram of an alternate embodiment of the thermal management valve in accordance with the present invention.

Referring now to FIG. 3, an alternate embodiment of the low-drag seal arrangement 132 is shown. Like reference numbers have been used to designate similar structures in the embodiment of FIGS. 2A, 2B, 2C with the reference numerals differing by 100. As shown in FIG. 3, a face seal piston 134 is shown in contact with a rotor 122. Face seal piston 134 has a reduced diameter portion 139 that reduces a contact area 141 between the face seal piston 134 and rotor 122. By reducing the contact area 141 compared to the contact area 38 shown in FIGS. 2B and 2C, the high pressure area Hp located above the rotor 122 flowing through the bore toward the rotor 122 will focus the high pressure onto the inner diameter of the face seal piston 134 in order to make a more absolute seal between the face seal piston 134 and the rotor 122, when the face seal piston 134 is in the closed position.

The embodiments described above all pertain to arrangements where the low-drag seal 32, 132 is connected to the housing 12; however, it is within the scope of this invention for the low-drag seal 32, 132 to be positioned on the rotor 22, 122 in order to close a bore formed within the housing 12.

Figure 4:
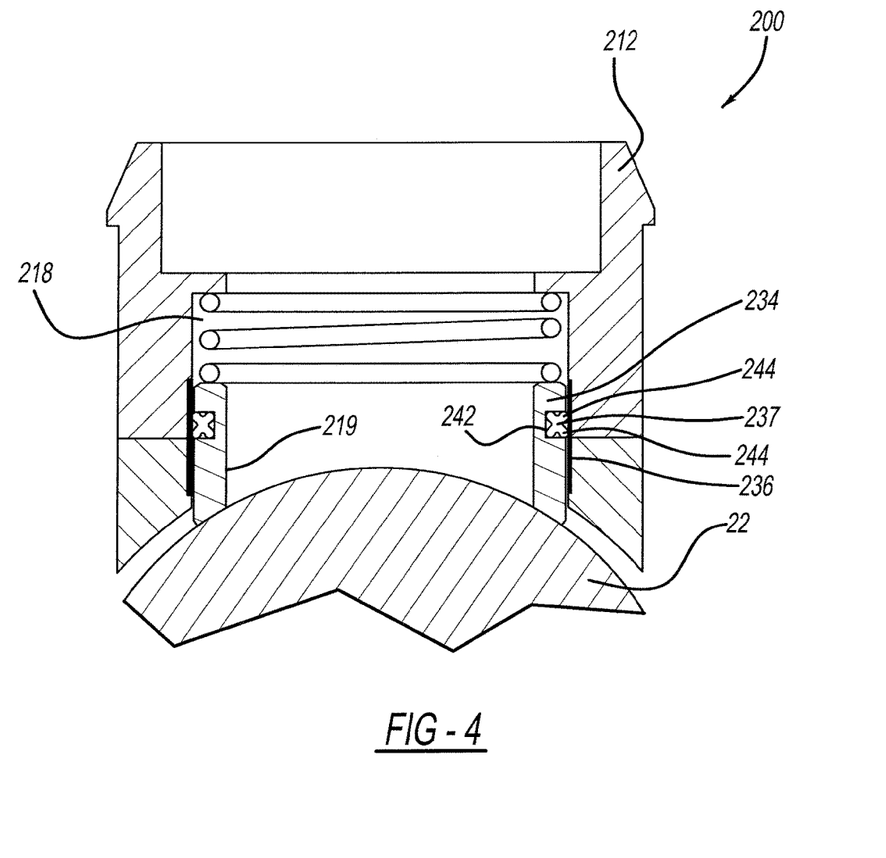
FIG. 4 is an alternate embodiment of the invention where the quad-seal is connected to the face seal piston.

FIG. 4 shows an alternate embodiment of the invention showing a low-drag seal arrangement 200 where a face seal piston 234 has a circumferential groove 242 formed on the surface of the face seal piston 234. Within the circumferential groove 242 is a quad-seal 237 which has two points of contact 244 that contact an inside surface of a bore 218 formed through a housing 212 of the low-drag seal arrangement 200 in accordance the present embodiment of the invention. The inside surface of the bore 218 has a portion 236 adjacent the two points of contact 244 that is either a coating of low friction material or low friction material formed into the material of the bore 218. An inner surface 219 of the face seal piston 234 is smooth and uniform without any ridges or ledges.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A low-drag seal arrangement for a thermal management valve comprising:
   a housing having at least one bore for flowing a fluid medium through said at least one bore;
   a rotor configured to rotate relative to said at least one bore between a closed position where the flow of fluid medium through said bore is blocked, an open position where fluid medium flows through said at least one bore and an intermediate position where the flow of fluid medium through said at least one bore is partially blocked by said rotor position relative to said at least one bore;
   a face seal piston positioned within said at least one bore and configured to move axially within said at least one bore, wherein said face seal piston has a portion coated with low-friction material, said portion being in selective engagement with said rotor when said rotor moves to said closed position or said intermediate position, wherein the face seal piston has an inner surface that is smooth and does not have any ridges or grooves;
   a circumferential groove formed in said bore, wherein said circumferential groove circumscribes a portion of said face seal piston when said face seal piston is positioned in said at least one bore;
   a quad-seal located within said circumferential groove for creating a seal between said bore a said face seal piston, wherein said face seal piston slides bi-directionally through said quad-seal as said face seal piston moves within said bore and said quad-seal maintains a sealed connection between said bore and said face seal piston during said axial movement of said face seal piston within said bore, wherein the quad-seal further includes two points of contact with the face seal piston, thereby creating a squeezing effect that centers the face seal piston in the bore;
   a spring seat formed on the at least one bore, such that the spring seat extends into the at least one bore above the face seal piston;
   a spring having one end in contact with said face seal piston and a second end in contact with the spring seat, wherein the spring applies force on the face seal piston in the direction of the rotor; and
   wherein the face seal piston has a reduced diameter portion that reduces a contact area between the face seal piston and rotor, wherein the reduced contact area allows high pressure located above the rotor flowing through the bore toward the rotor to focus the high pressure into the inner diameter of the face seal piston in order to make a more absolute seal between the face seal piston and rotor when the face seal piston is in the closed position.

2. The low-drag seal arrangement of claim 1 further comprising a shaft extending through said housing and connected to said rotor, wherein said shaft rotates about a longitudinal axis and is rotatably supported by bearings positioned on walls of the housing and the shaft rotates in order to move the rotor between the closed position, the open position and the intermediate position.

3. The low-drag seal arrangement of claim 2 wherein said rotor further comprises a passage formed on a surface wherein said passage aligns with the face seal piston when the rotor is in the open position, thereby allowing fluid medium to flow through the at least one bore of the face seal piston.

4. The low-drag seal arrangement of claim 2 wherein the shaft has an actuation end extending outside of the housing for interacting with an actuator that controls the rotation of the shaft and rotor about the axis.

5. The low-drag seal arrangement of claim 1 further comprising a seal contact area between the outer surface of the face seal piston and the quad-seal and a low-friction material coats a portion of the face seal piston in the contact area in order to reduce the amount of friction generated in the contact area.

6. The low-drag seal arrangement of claim 5 wherein the low-friction material is formed with or into a surface of the material of the face seal piston.

7. The low-drag seal arrangement of claim 5 wherein the low-friction material is one selected from the group consisting of polytetrafluoroethylene, ceramic, nylon, high density polyethylene and graphite.

8. The low-drag seal arrangement of claim 5 wherein the low-friction material is any type of material having a static friction coefficient equal to or less than 0.04.

* * * * *